(12) United States Patent
Shepherd et al.

(10) Patent No.: US 10,767,024 B2
(45) Date of Patent: Sep. 8, 2020

(54) SOFT ACTUATOR AND METHODS OF FABRICATION

(71) Applicant: Cornell University, Ithaca, NY (US)

(72) Inventors: Robert F. Shepherd, Brooktondale, NY (US); Benjamin C. MacMurray, Ithaca, NY (US); Huichan Zhao, Ithaca, NY (US)

(73) Assignee: Cornell University, Ithaca, NY (US)

( * ) Notice: Subject to any disclaimer, the term of this patent is extended or adjusted under 35 U.S.C. 154(b) by 0 days.

(21) Appl. No.: 15/303,044

(22) PCT Filed: Apr. 9, 2015

(86) PCT No.: PCT/US2015/025183
§ 371 (c)(1),
(2) Date: Oct. 10, 2016

(87) PCT Pub. No.: WO2015/157560
PCT Pub. Date: Oct. 15, 2015

(65) Prior Publication Data
US 2017/0029592 A1 Feb. 2, 2017

Related U.S. Application Data

(60) Provisional application No. 61/977,483, filed on Apr. 9, 2014.

(51) Int. Cl.
*C08J 9/26* (2006.01)
*C08J 9/08* (2006.01)
(Continued)

(52) U.S. Cl.
CPC . *C08J 9/26* (2013.01); *C08J 9/08* (2013.01); *C08J 9/10* (2013.01); *C08J 9/365* (2013.01); *F15B 15/103* (2013.01); *C08J 2201/026* (2013.01); *C08J 2201/0444* (2013.01); *C08J 2201/0446* (2013.01); *C08J 2203/02* (2013.01);
(Continued)

(58) Field of Classification Search
CPC ......... C08J 9/26; C08J 9/08; C08J 9/10; C08J 9/365; F15B 15/103
See application file for complete search history.

(56) References Cited

U.S. PATENT DOCUMENTS 3,943,072 A * 3/1976 Thomson ........... B01J 20/28004
435/176
5,134,569 A * 7/1992 Masters ................ B29C 35/08
156/272.8
(Continued)

FOREIGN PATENT DOCUMENTS

WO 2012148472 11/2012
WO WO-2012148472 A2 * 11/2012 ............ B25J 9/1075
(Continued)

*Primary Examiner* — Kelly M Gambetta
(74) *Attorney, Agent, or Firm* — Hodgson Russ LLP

(57) ABSTRACT

Soft actuators are fabricated from materials that enable the actuators to be constructed with an open-celled architecture such as an interconnected network of pore elements. The movement of a soft actuator is controlled by manipulating the open-celled architecture, for example inflating/deflating select portions of the open-celled architecture using a substance such as compressed fluid.

23 Claims, 5 Drawing Sheets

(51) Int. Cl.
C08J 9/10 (2006.01)
C08J 9/36 (2006.01)
F15B 15/10 (2006.01)

(52) U.S. Cl.
CPC ........ *C08J 2203/04* (2013.01); *C08J 2203/10* (2013.01); *C08J 2205/05* (2013.01); *C08J 2205/06* (2013.01); *C08J 2207/00* (2013.01); *C08J 2300/26* (2013.01); *C08J 2383/04* (2013.01)

(56) References Cited

U.S. PATENT DOCUMENTS

2011/0151259 A1* 6/2011 Jarman-Smith .......... C08J 3/203
    428/402
2011/0251698 A1* 10/2011 Gupta ................. A61F 2/30767
    623/23.56

FOREIGN PATENT DOCUMENTS

WO         2013130760     9/2013
WO    WO-2013130760 A2 * 9/2013 .............. B25J 9/142

* cited by examiner

SOFT ACTUATOR AND METHODS OF FABRICATION

CROSS-REFERENCE TO RELATED APPLICATIONS

This application claims the benefit of U.S. Provisional Patent Application No. 61/977,483 filed Apr. 9, 2014, which is incorporated by reference.

FIELD OF THE INVENTION

The invention relates generally to actuators, for example, actuators that move or control an object, a mechanism or a system. More specifically, the invention relates to soft actuators fabricated from materials that enable the actuators to be constructed with an open-celled architecture. An open-celled architecture may be manipulated—inflated/deflated—such as by directing a substance to flow through select portions of the open-celled architecture in order to control movement of the actuator.

BACKGROUND OF THE INVENTION

In many ways, the sophisticated motion of organisms is enabled by the selective stiffening of soft tissue. Cephalopods rely on muscular hydrostats for structural support and locomotion without a skeletal system. Land based organisms also use hydrostatic mechanisms for selective stiffening of tissue (e.g., the trunk of an elephant or the spongy tissue of the corpora cavernosa).

The field of soft robotics endeavors to use compliant structures to reduce the complexity of machines while also increasing their sophistication towards that of biological analogs. One manifestation of this goal is embodied intelligence: instead of a central computer that commands multiple components in a prescribed way, distributed networks of materials automatically respond to their environment. An example of embodied intelligence in nature is that of a tree's leaves collapsing in a strong wind to prevent its branches from breaking. Soft elastomers that can deform at very low stresses (~100's of kPa's) can program embodied intelligence into pneumatically actuated machines; a prime example is that of an "open-loop" gripper that wraps around objects based on their difference in stiffness. Another outcome of using easily deformable materials and structures in soft robotics is smooth and continuous motions during actuation—mobile robots move in similar fashion to biological organisms, with simple machine design. While these motions are similar, their functional mechanisms are completely different (i.e., muscle fibers vs. inflating members).

Thus, there is a need for soft actuators made of a construction that enables formation into any geometry and of a construction that facilitates controlled movement of the actuator. The soft actuators are made from materials that can be manipulated, for example to simulate selective stiffening. The invention satisfies this need.

SUMMARY OF THE INVENTION

The invention is directed to actuators that may be used to control an object, a mechanism or a system. The soft actuators are fabricated from certain materials that enable the controlled movement of the actuator. Specifically, the materials used to produce the soft actuators enable the actuators to be constructed with an open-celled architecture. According to the invention, an open-celled architecture is any labyrinth of openings with each opening defined by a wall. One example of an open-celled architecture discussed below is directed to an interconnected network of pore elements.

The open-celled architecture may be manipulated—inflated/deflated—such as by directing a substance to flow through select portions of the open-celled architecture.

In one embodiment, the soft actuator includes two or more materials that are combined into a mixture. One material is an elastomer material which is made of polymers that are joined by chemical bonds. Types of elastomer materials contemplated by the invention include, for example, rubber, polyurethane, polybutadiene, neoprene, silicone, polydimethylsiloxane (PDMS), to name a few.

Another material used to fabricate the soft actuator is an additive material. An additive material may include, for example, a fugitive material or a material that facilitates formation of foam, i.e., foaming agent material. A fugitive material is one that becomes partially inert, or deactivated, during or after going through a chemical process such as a curing process. Types of fugitive materials contemplated by the invention include, for example, sugar crystals, or salts (such as sodium chloride, sodium bicarbonate, or ammonium bicarbonate). Types of foaming agent materials include, for example, sodium laureth sulfate or carbon dioxide. A foaming agent material is one that generates gas during a curing process.

The two or more materials can be either cast or injection molded into molds of any configuration in in order to form the actuator into any arbitrary geometry. However, it is also contemplated that the two or more materials may be cured in an unmolded configuration.

The two or more materials are cured. Curing is a process that solidifies the two or more materials. For example, curing may involve a chemical reaction such as polymerization or physical action such as evaporation or the generation of gas.

Examples of curing the mixture may include setting the mixture at room temperature for a specific duration of time, heating the mixture at a certain temperature for a specific duration of time, or evaporating away a solvent.

In embodiments of the invention of which the additive material is a fugitive material, some or all of the fugitive material is removed from the cured mixture. Removal of the fugitive material produces a structure that includes an interconnected network of pore elements with each pore element defined by a wall. The fugitive material may be removed for example by decomposing such as evaporating the fugitive material such as by using heat or dissolving the fugitive material such as by using a recirculating warm fluid bath. Removing the fugitive material produces a structure that includes an open-celled architecture, such as an interconnected network of pore elements.

In embodiments of the invention of which the additive material is a foaming agent material, the removal step is eliminated. Combining an elastomer material with a foaming agent material cures to produce a structure that includes an open-celled architecture. Specifically, the foaming agent material includes gases that create openings while curing.

In certain embodiments, the soft actuator is coated with a sealant material. In other embodiments the sealant material includes a strain-limiting element to limit the movement of the open-celled architecture when actuated. Types of sealant materials contemplated by the invention include, for example, silicone, polydimethylsiloxane (PDMS), and polyurethane to name a few. Types of strain-limiting elements that may be used to limit movement of the open-celled architecture when actuated include, for example, a nylon mesh, or fibrous elements such as glass fibers or carbon fibers, to name a few. However, non-fibrous elements are also contemplated, for example particles such as sand.

The soft actuator is actuated by applying pressure generated by a power source. The power sources contemplated include electric current, hydraulic fluid pressure, or pneumatic pressure. Pressure is applied using any substance, for example, gas such as air or liquid such as water, to select portions of the structure of the soft actuator. Specifically, pressure creates tension to select walls of each pore element of the interconnected network of pore elements causing movement of the actuator. The actuator may move in any direction and includes for example bending, curling, gripping expanding, contracting, etc.

A new class of soft actuators is presented—ones based on pneumatically powered, elastomeric foams. The actuators are open-celled foams with a continuous pathway for inflation/deflation by substances. More specifically, soft actuators are fabricated from organic, elastomeric foams. These actuators operate via fluidic inflation: compressed substance flows into the open-celled architecture and pressurizes the surfaces, adding tension to the walls of each opening and resistance to bending in all directions. By patterning inextensible fibers on the surface of these structures, inflation may be limited to specific portions or areas and thus direct the mode of actuation and programs the function of the actuator.

According to the invention, the soft actuators may be fabricated to any geometry with any size/shape including for example human organs, gripper designs, etc. The invention and its attributes and advantages will be further understood and appreciated with reference to the accompanying drawings.

BRIEF DESCRIPTION OF THE DRAWINGS

The preferred embodiments of the invention will be described in conjunction with the appended drawings provided to illustrate and not to the limit the invention, where like designations denote like elements, and in which.

DETAILED DESCRIPTION

According to the invention, soft actuators may be fabricated using elastomeric foams. One embodiment of the invention is directed to the development of soft actuators—such as from organic elastomeric foams—that are configured and sized and shaped such that the actuators may be operated by selective fluidic inflation and deflation. For purposes of this application, the term "fluid" or "fluidic" refers to any substance that continually deforms including, for example, gas such as air or liquid such as water.

Selective fluidic inflation may be developed by directing compressed air flows into selected portions of the open-celled architecture of the interior of the actuator. The resultant increase of the air pressure adds tension to selected walls of each opening thereby causing movement of the actuator. Certain embodiments of the invention may include components that are not extensible to the same degree as the foam components thereby allowing the movement of the actuator produced through fluidic inflation and deflation to be directable.

Soft actuators are fabricated from materials that enable the actuators to be constructed with an open-celled architecture or any labyrinth of openings. Each opening is defined by a wall. The movement of a soft actuator is controlled by manipulating the open-celled architecture, for example inflating/deflating select portions of the open-celled architecture using compressed fluid generated by a power source.

Figure 1:
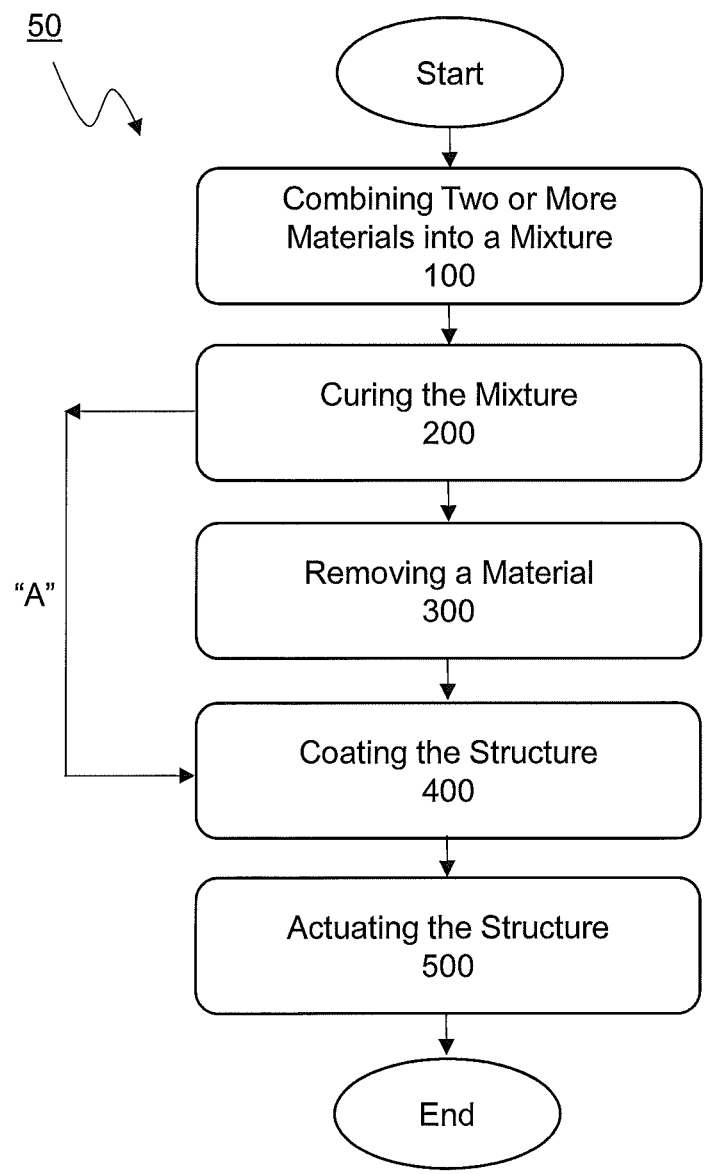
FIG. 1 illustrates a flow chart of an exemplary method for producing a soft actuator according to the invention.

FIG. 1 illustrates a flow chart 50 of an exemplary method for producing a soft actuator according to the invention. To fabricate a soft actuator according to the invention, a silicone elastomer precursor is combined with an additive material at step 100. The additive material may be a fugitive material that is granular such as a salt or sugar crystals. The additive material may also be a foaming agent material.

As one example, the elastomer material is a silicone material and the fugitive material is sodium chloride. In another example, the elastomer material is a silicone material and the fugitive material is ammonium bicarbonate. More specifically, the silicone material may be a tin-cured poly-dimethyl siloxane material. In this embodiment, the volume of ammonium bicarbonate added is equal to the final foam pore volume (neglecting any entrapped air).

The mixture may be poured into sheets of a specific thickness, for example approximately 1-10 millimeters (mm), which may be shaped into a functional form via cutting post curing or by pouring into a mold pre-curing.

Figure 2:
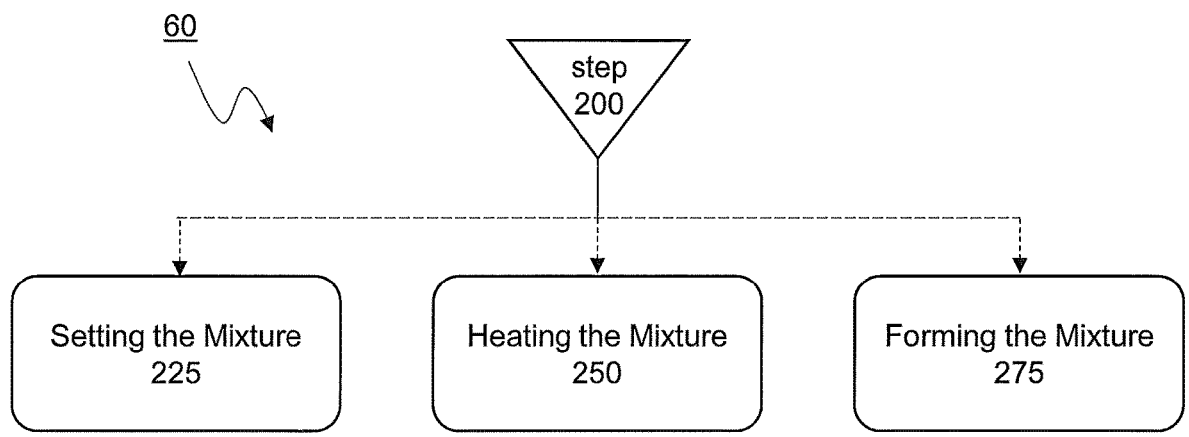
FIG. 2 illustrates a flow chart of a particular method step of the exemplary method for producing a soft actuator according to the invention.

At step 200 the mixture is cured. As shown by the flow chart 60 of FIG. 2, the curing step may be performed by either setting the mixture at step 225, heating the mixture at step 250, or forming the mixture at step 275. According to one embodiment, the mixture is cured by heating at 80 degrees Celsius (° C.) for 30 minutes. According to another embodiment, the mixture is cured by setting at room temperature, approximately 20° C.

Figure 3:
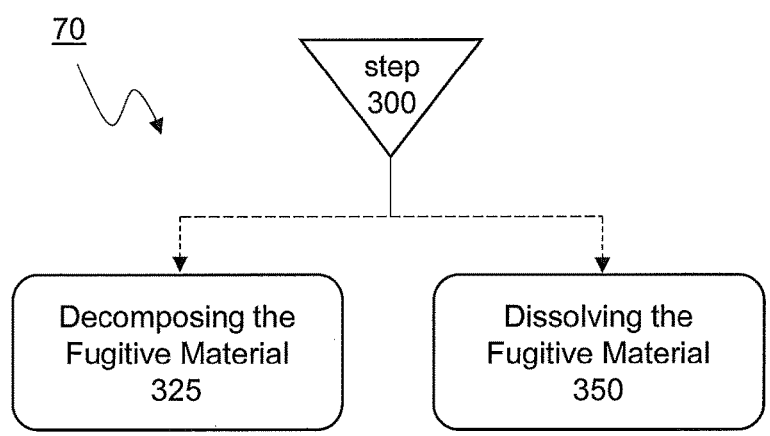
FIG. 3 illustrates a flow chart of a particular method step of the exemplary method for producing a soft actuator according to the invention.

At step 300 the fugitive material is removed. As shown by the flow chart 70 of FIG. 3, the removing step may be performed by either decomposing—such as evaporating—the fugitive material at step 325 or dissolving the fugitive material at step 350.

According to one embodiment, the fugitive material in the form of table salt (NaCl) with an average diameter of approximately 300 millimeters (mm) is dissolved in a recirculating bath of warm water at a temperature of approximately 95 degrees Celsius (° C.).

According to another embodiment, the fugitive material is removed by decomposition. Specifically, the mixture is placed in a vacuum oven above 50° C. such that the ammonium bicarbonate decomposes into water, carbon dioxide ($CO_2$), and ammonia ($NH_3$). This process may be expedited, for example, by heating the mixture to 140° C.

while pulling a continuous vacuum. This removes the ammonium bicarbonate in 1-8 hours depending on its size/diameter.

As shown in FIG. 1, in embodiments in which the additive material is a foaming agent material, the removal step is eliminated as shown by line "A".

Figure 4:
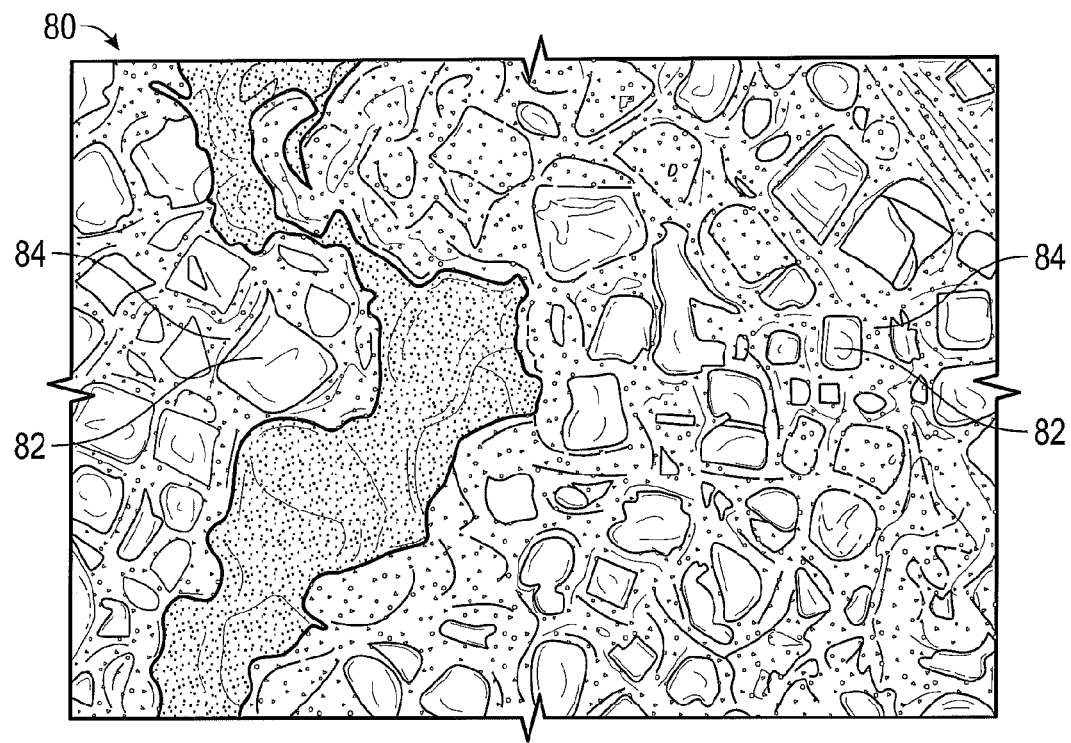
FIG. 4 illustrates a structure including an open-celled architecture according to one embodiment of the invention.

Combining an elastomer material with either a foaming agent material or a fugitive material produces a structure including an open-celled architecture as shown in FIG. 4. FIG. 4 illustrates a portion of the structure of a soft actuator 80 that includes an open-celled architecture in the form of an interconnected network of pore elements 82, which each pore element 82 defined by a wall 84. The interconnected network of pore elements 82 (i.e., open cell foam) may be used to transport a substance such as a gas or liquid.

Figure 5:
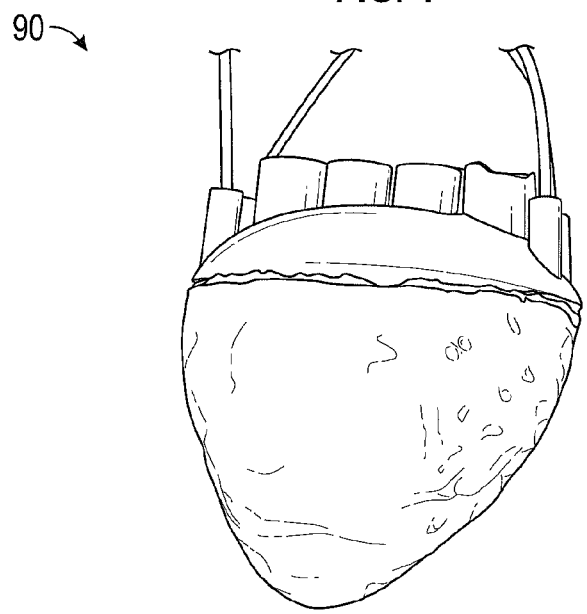
FIG. 5 illustrates a soft actuator in the form of a heart according to the invention.

According to the invention, soft actuators can be formed into any geometry with any size/shape including for example human organs, gripper designs, etc. FIG. 5 illustrates a soft actuator in the form of a heart 90. Fluidic inflation and deflation of select pore elements of the structure simulates a beating heart.

Turning back to FIG. 1, the structure of the soft actuator may be sealed by coating it in a sealant material such as a silicone material. In certain embodiments, the silicone material includes a strain-limiting element such as a pattern of fiber glass, which may be laser cut or cut by hand.

At step 500, the soft actuator is actuated such as by applying pressure generated by a power source. The pressure is applied to select portions of the structure of the soft actuator creating tension to select walls of each pore element of the interconnected network thereby causing movement of the actuator.

Direct control over the structure of the interconnected network of pore elements is achieved by controlling the concentration and shape of the additive material. In certain embodiments, unimorph bending actuators are created with two different porosities ($\varphi=0.8$ and $\varphi=0.6$ volume fraction void space). It was observed that the actuator with a porosity of $\varphi=0.6$ open internal volume actuated to larger maximum amplitudes than the actuator with a porosity $\varphi=0.8$ prior to failure (via an "aneurysm" of the expanding surface). It is concluded this difference to the stresses is attributable to the type of sealant material.

In a particular embodiment of the invention, the actuator includes a strip-type structure with glass fibers on all but the top side. When pressurized, the top layer stretches while the bottom does not, resulting in a bending motif. In order to simulate the stresses in the exterior walls of these actuators (the parts that typically fail), empty channels within the actuator are approximated with the empty channels including periodic connections from the bottom to top chamber along the length of the actuator. As the number of connections is decreased, the stress on the two connectors at the front and end of the channels increases dramatically for a nearly equivalent bending curvature. It is concluded that the strain from the expanding member is more evenly distributed over the bottom layer with increasing connections from the top to the bottom layer.

The open-celled architecture of the soft actuators are visualized with porosities of $\varphi=0.6$, 0.7, and 0.8 volume fraction open cell foams. From the cross-sectional view of these actuators, it is clear that the $\varphi=0.8$ foams have far thinner and fewer connections from the expanding layer to the bottom layer, implying from the simulations that the $\varphi=0.8$ foams have more stress on their external walls than the 0.6 ones for a given pressure. Ultimately, the $\varphi=0.8$ foams fail before the $\varphi=0.6$ ones due to internal stresses rupturing them from the pressure differential.

Figure 6:
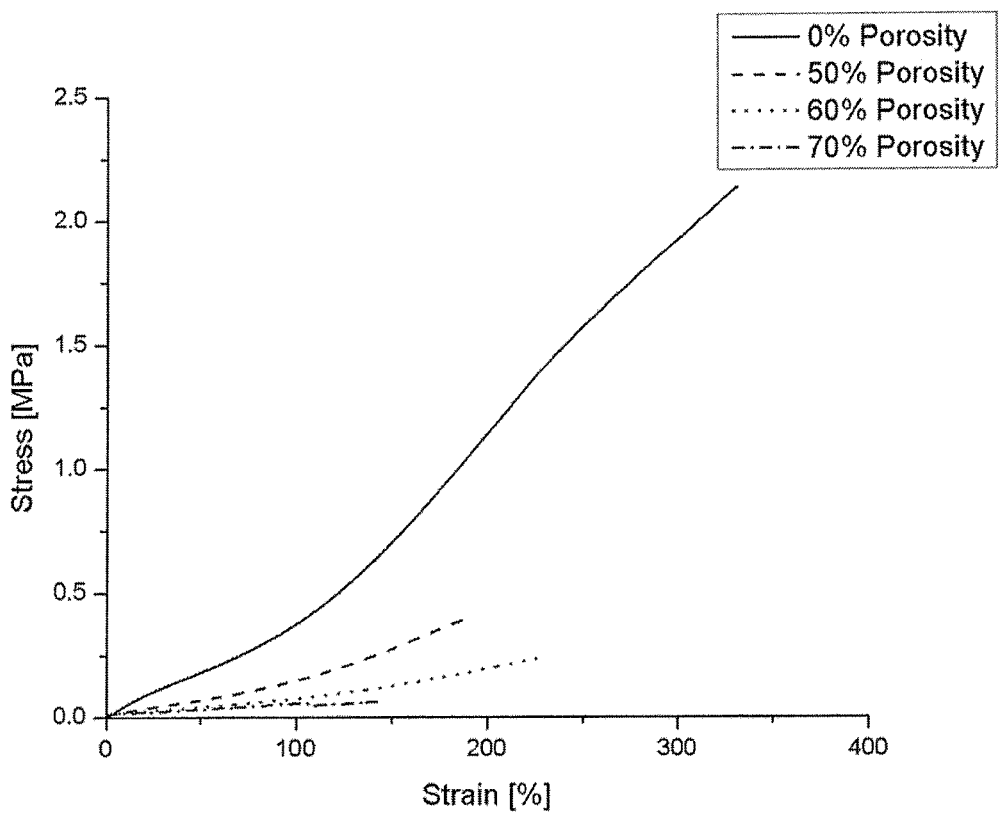
FIG. 6 illustrates a graph of stress versus strain of various soft actuators according to the invention.

Soft actuators of various porosity are evaluated including actuators at 0% porosity, 50% porosity, 60% porosity, and 70% porosity. FIG. 6 illustrates a graph of stress in Mega-Pascals (MPa) versus strain percentage (%) of these soft actuators and FIG. 7 illustrates a graph of actuation force in Newtons (N) versus inflation pressure is kiloPascals (kPa).

As shown by the tensile testing in FIG. 6, processing the elastomer into a foam results in a less stiff material (i.e. 0% porosity showed a higher tensile modulus than 50%, 60%, and 70%). This additional structural "softening" of an already soft elastomer, greatly increases this material utility as a soft actuator. A more-compliant actuator shows greater deformation when pressurized resulting in greater actuation. Thus, a foam with high porosity may require a lower inflation pressure to obtain comparable deformation. As can also be seen, the tensile modulus is roughly proportional to the porosity (i.e. 0% porous is roughly twice as stiff as 50% porous).

It is noted that all of the tested foams extended well past 100% strain. In the plot, 0% porous samples extended much further than the 70% porous samples which agree with the empirical observations that the internal foam tears apart before the sealing layer ruptures. Clearly, this is a preferred failure mode (over the opposite) as it provides a visual indication that the foam has failed without the rapid release of air into the surrounding environment.

Figure 7:
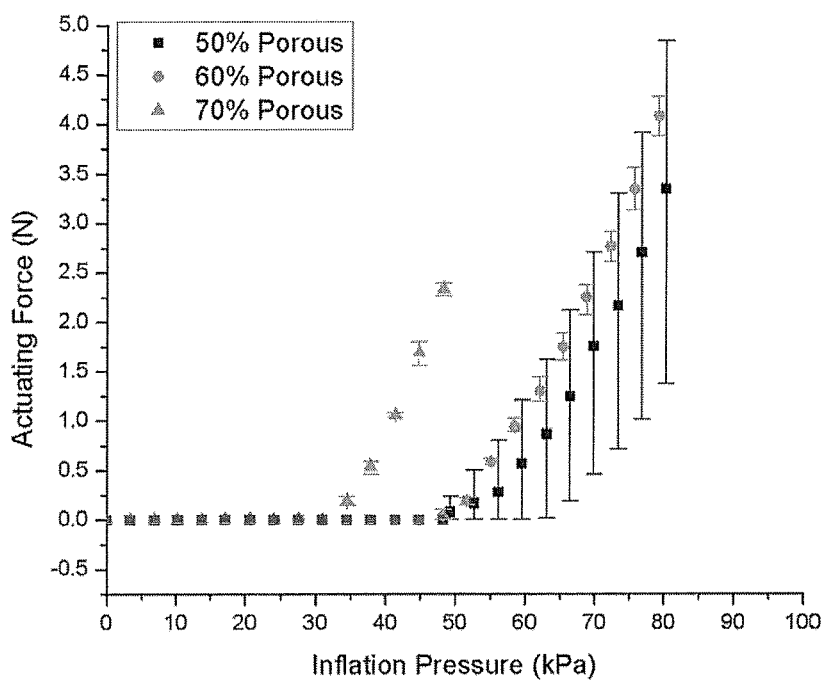
FIG. 7 illustrates a graph of actuation force versus inflation pressure of various soft actuators according to the invention.

Blocked force measurements to characterize monolithic bending actuators are the subject of FIG. 7. The measurements consist of recording force of a confined bending actuator as a function of inflation pressure in which all samples are actuated pneumatically. As shown in FIG. 7, higher porosity actuators provide greater force at lower inflation pressure. However, there also appears to be a tradeoff in that actuators with higher porosity fail at lower overall inflation pressure. Thus, actuators with lower porosity (e.g. 50%) can provide a higher overall force.

Figure 8:
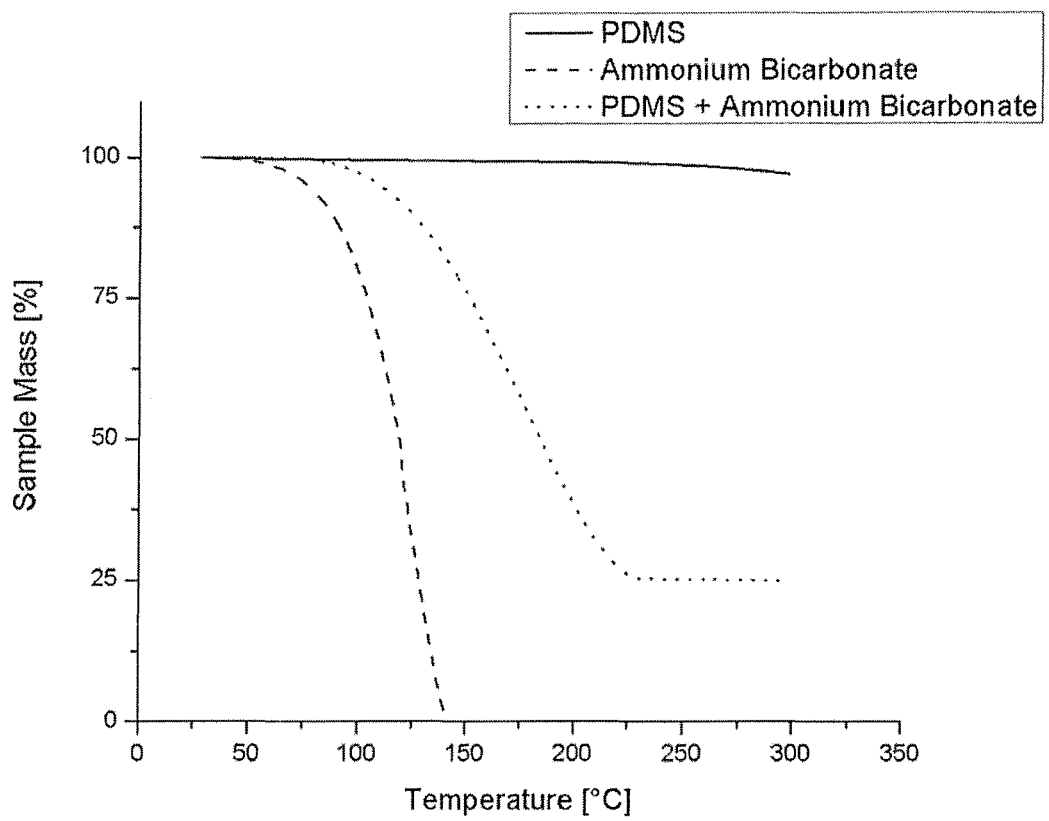
FIG. 8 illustrates a graph of sample mass versus temperature of various soft actuators according to the invention.
Figure 9:
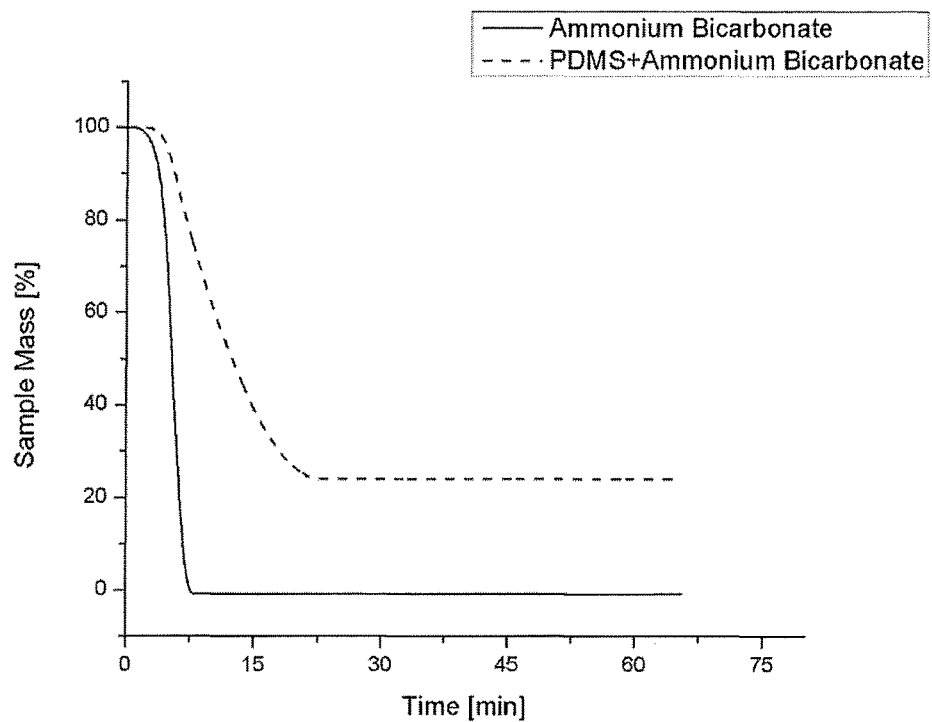
FIG. 9 illustrates a graph of sample mass versus time of various soft actuators according to the invention.

FIG. 8 illustrates a graph of sample mass in percent (%) versus temperature in degrees Celsius (° C.) of the elastomer material polydimethylsiloxane (PDMS), the additive material ammonium bicarbonate, and the combination of PDMS and ammonium bicarbonate. FIG. 9 illustrates a graph of sample mass in percent (%) versus time in minutes of various soft actuators according to the invention. FIG. 8 and FIG. 9 reveal several important aspects of the thermal stability of the actuators. As shown by FIG. 8, the pure ammonium bicarbonate begins thermal decomposition at approximately 50° C. and that this behavior is unchanged when mixed into the PDMS. It is also noted that the PDMS is thermally stable through 200° C. FIG. 9 shows that the ammonium bicarbonate decomposes entirely at 140° C. within a short time span. Again, this behavior is unchanged when it is mixed with the PDMS. The remaining mass (after ~20 min) corresponds with the initial mass of PDMS.

While the disclosure is susceptible to various modifications and alternative forms, specific exemplary embodiments of the invention have been shown by way of example in the drawings and have been described in detail. It should be understood, however, that there is no intent to limit the disclosure to the particular embodiments disclosed, but on the contrary, the intention is to cover all modifications, equivalents, and alternatives falling within the scope of the disclosure as defined by the appended claims.

The invention claimed is:

1. A method for producing a soft actuator, comprising the steps of:

combining two or more materials into a mixture, wherein a first material is an elastomer material and a second material is an additive material;

curing the mixture to obtain a cured mixture that produces an elastomeric foam structure with an open-celled architecture in the form of an interconnected network of pore elements with each pore element defined by a wall; and sealing the structure of the soft actuator by coating it in a sealant material, wherein the actuator is configured to be operated by fluid inflation and deflation; and wherein the coated sealant material is configured to seal the elastomeric foam structure and prevent release of fluid into a surrounding environment during fluidic inflation and deflation.

2. The method for producing a soft actuator according to claim 1, further comprising the step of:

removing some or all of the additive material from the cured mixture.

3. The method for producing a soft actuator according to claim 1, wherein the sealant material includes a strain-limiting element.

4. The method for producing a soft actuator according to claim 1, further comprising the step of:

actuating the structure by applying pressure to one or more select portions of the interconnected network of pore elements.

5. The method for producing a soft actuator according to claim 1, wherein said curing step further comprising the step of:

setting the mixture at room temperature for a specific duration of time.

6. The method for producing a soft actuator according to claim 1, wherein said curing step further comprising the step of:

heating the mixture at a certain temperature for a specific duration of time.

7. The method for producing a soft actuator according to claim 1, wherein said curing step further comprising the step of:

forming the mixture using a mold.

8. The method for producing a soft actuator according to claim 2, wherein said removing step further comprising the step of:

decomposing the additive material.

9. The method for producing a soft actuator according to claim 2, wherein said removing step further comprising the step of:

dissolving the additive material.

10. The method for producing a soft actuator according to claim 1, wherein the elastomer material includes a silicone material.

11. The method for producing a soft actuator according to claim 1, wherein the elastomer material includes polydimethylsiloxane (PDMS).

12. The method for producing a soft actuator according to claim 1, wherein the additive material includes sodium chloride.

13. The method for producing a soft actuator according to claim 1, wherein the additive material includes ammonium bicarbonate.

14. The method for producing a soft actuator according to claim 1, wherein the sealant material includes polydimethylsiloxane (PDMS).

15. The method for producing a soft actuator according to claim 3, wherein the strain-limiting element includes a nylon mesh.

16. The method for producing a soft actuator according to claim 3, wherein the strain-limiting element includes glass fibers.

17. The method for producing a soft actuator according to claim 1, wherein said curing step further comprising the step of:

forming the mixture into an unmolded configuration.

18. The method for producing a soft actuator according to claim 17, wherein said forming step further comprises 3D printing the mixture into the unmolded configuration.

19. The method for producing a soft actuator according to claim 1, wherein the additive material is a salt material.

20. The method for producing a soft actuator according to claim 1, wherein the additive material is a foaming agent configured to generate gas during a curing process.

21. The method for producing a soft actuator according to claim 1, wherein the additive material is removable by decomposition or evaporation.

22. The method for producing a soft actuator according to claim 1, wherein the soft actuator is fabricated to a geometry with a shape of organs.

23. The method for producing a soft actuator according to claim 1, wherein the fluid is gas or liquid.

* * * * *